United States Patent
Chuda et al.

(10) Patent No.: US 11,162,257 B2
(45) Date of Patent: Nov. 2, 2021

(54) PLASTER-BASED ACOUSTIC BOARD

(71) Applicant: SAINT-GOBAIN PLACO, Suresnes (FR)

(72) Inventors: Katarzyna Chuda, Asniere sur Seine (FR); Caroline Demathieu-Roeltgen, Meaux (FR); Véronique Chopin, Bruyeres sur Oise (FR)

(73) Assignee: SAINT-GOBAIN PLACO, Courbevoie (FR)

( * ) Notice: Subject to any disclaimer, the term of this patent is extended or adjusted under 35 U.S.C. 154(b) by 704 days.

(21) Appl. No.: 16/069,684

(22) PCT Filed: Jan. 11, 2017

(86) PCT No.: PCT/FR2017/050057
§ 371 (c)(1),
(2) Date: Jul. 12, 2018

(87) PCT Pub. No.: WO2017/121954
PCT Pub. Date: Jul. 20, 2017

(65) Prior Publication Data
US 2019/0017261 A1    Jan. 17, 2019

(30) Foreign Application Priority Data
Jan. 13, 2016   (FR) ..................................... 1650245

(51) Int. Cl.
*E04B 1/86* (2006.01)
*E04C 2/04* (2006.01)
*B32B 5/02* (2006.01)
*B32B 13/02* (2006.01)
*B32B 13/08* (2006.01)
*B32B 13/12* (2006.01)
*B32B 13/14* (2006.01)
*B32B 27/06* (2006.01)
*B32B 27/30* (2006.01)
*B32B 27/32* (2006.01)
*E04B 1/84* (2006.01)

(52) U.S. Cl.
CPC .................. *E04B 1/86* (2013.01); *B32B 5/02* (2013.01); *B32B 5/022* (2013.01); *B32B 5/024* (2013.01); *B32B 13/02* (2013.01); *B32B 13/08* (2013.01); *B32B 13/12* (2013.01); *B32B 13/14* (2013.01); *B32B 27/06* (2013.01); *B32B 27/302* (2013.01); *B32B 27/306* (2013.01); *B32B 27/308* (2013.01); *B32B 27/32* (2013.01); *E04C 2/043* (2013.01); *B32B 2260/021* (2013.01); *B32B 2260/044* (2013.01); *B32B 2260/046* (2013.01); *B32B 2262/101* (2013.01); *B32B 2307/102* (2013.01); *B32B 2307/54* (2013.01); *B32B 2607/00* (2013.01); *E04B 2001/8461* (2013.01); *Y10T 428/26* (2015.01); *Y10T 428/27* (2015.01)

(58) Field of Classification Search
CPC ... E04B 1/86; E04B 2001/8461; B32B 5/024; B32B 5/02; B32B 5/022; B32B 13/02; B32B 13/08; B32B 13/12; B32B 13/14; B32B 27/06; B32B 27/302; B32B 27/306; B32B 27/308; B32B 27/32; B32B 2307/54; B32B 2260/021; B32B 2260/044; B32B 2260/046; B32B 2262/101; B32B 2307/102; B32B 2607/00; B32B 5/08; B32B 2255/02; E04C 2/043; Y10T 428/27; Y10T 428/26
See application file for complete search history.

(56) References Cited

U.S. PATENT DOCUMENTS

| | | | | |
|---|---|---|---|---|
| 4,683,165 | A * | 7/1987 | Lindemann | C08F 265/04 442/173 |
| 6,110,575 | A | 8/2000 | Haga | |
| 6,548,155 | B1 * | 4/2003 | Jaffee | B32B 5/26 428/297.4 |
| 2012/0148806 | A1 * | 6/2012 | Dubey | B28B 19/0092 428/193 |
| 2013/0178126 | A1 * | 7/2013 | Bennett | E04C 2/043 442/327 |

FOREIGN PATENT DOCUMENTS

| | | |
|---|---|---|
| JP | 2005-537149 A | 12/2005 |
| WO | WO 2004/018172 A2 | 3/2004 |
| WO | WO 2005/103367 A2 | 11/2005 |
| WO | WO-2005103367 A2 * | 11/2005 ............. B32B 13/14 |

OTHER PUBLICATIONS

International Search Report as issued in International Patent Application No. PCT/FR2017/050057, dated Apr. 10, 2017.
Notice of Reasons for Refusal as issued in Japanese Patent Application No. 2018-536494, dated Apr. 13, 2021.

* cited by examiner

*Primary Examiner* — David Sample
*Assistant Examiner* — Donald M Flores, Jr.
(74) *Attorney, Agent, or Firm* — Pillsbury Winthrop Shaw Pittman LLP

(57) ABSTRACT

A plaster-based board includes a core made of plaster positioned between two coating layers, in which a textile including glass fibers and an organic binder constitutes at least one of the coating layers and/or the textile is embedded in the plaster constituting the core. In the textile, the binder includes one or more organic polymers having a glass transition temperature which varies from −10 to +25° C., measured by differential scanning calorimetry according to the standard ISO 11357-1:2009.

24 Claims, No Drawings

PLASTER-BASED ACOUSTIC BOARD

CROSS-REFERENCE TO RELATED APPLICATIONS

This application is the U.S. National Stage of PCT/FR2017/050057, filed Jan. 11, 2017, which in turn claims priority to French patent application number 1650245 filed Jan. 13, 2016. The content of these applications are incorporated herein by reference in their entireties.

The invention relates to a plaster-based board endowed with acoustic properties. Such a board can be used in particular to produce a wall surface, a ceiling or a floor, and a partition wall.

Plaster-based boards are generally composite boards comprising a core made of plaster positioned between two coating layers made of paper or of cardboard. These boards have mechanical properties which meet the standards in force, in particular a good resistance to deflection under load.

Plaster-based boards as such do not exhibit particular acoustic performance levels. When it is desired to improve these performance levels, it is known to combine said board with a sound-insulating material, such as a glass or rock wool or a polymer, in order to form a composite product. This composite product can be held in place by means of profiled elements, of an adhesive, of screws or of dowels, according to the targeted use.

The commonest plaster-based boards have a mean thickness of 12.5 mm and are generally sold under the "BA 13" name. These boards exhibit a weight per unit area of the order of 9 kg/m$^2$. It is admittedly well known that it is possible to improve the acoustic performance levels of a board by increasing its weight per unit area, for example up to 12 kg/m$^2$, without modifying its thickness, but this is necessarily reflected by an increase in the amount of plaster in the board.

For this reason, the cost of the board is higher.

The installation of a board with a higher weight per unit area also presents disadvantages: because of the increase in the weight, the board is more problematic and testing to handle and also, owing to the fact that the board is denser, it is more difficult to penetrate through it when the attaching to the support is carried out using screws. These disadvantages become serious when the board has be attached at height, for example to a ceiling or to produce a partition.

It is an aim of the present invention to provide a plaster-based board which exhibits improved acoustic properties, while retaining good mechanical properties.

This aim is achieved according to the invention by replacing at least one of the coating layers made of paper or of cardboard of the plaster-based board with a textile comprising glass fibers and an organic binder and/or by incorporating said textile in the core made of plaster.

The plaster-based board thus comprises a textile including glass fibers and an organic binder, and the board is characterized in that said textile constitutes the coating layer or layers of the core made of plaster and/or is embedded in the plaster constituting the core.

"Textile" is understood to mean a nonwoven, existing in particular in the form of a nap or of a mat, or a fabric.

The textile in accordance with the invention includes at least 80% by weight of glass fibers and preferably at least 90%.

The glass fibers can be provided in the form of individual filaments having a diameter which varies from 5 to 30 μm, of strands comprising a plurality of these glass filaments (base strand) or of an assemblage of several base strands (rovings). The linear density of the base glass strands or of assemblage of such strands varies from 30 to 1500 tex.

The glass can be E, C, R or AR (alkali-resistant) glass. E or C glass is preferred.

The glass fibers present in the nonwoven can be continuous or cut. The length of the cut fibers generally varies from 0.5 to 15 cm, preferably from 1 to 10 cm and advantageously from 1 to 8 cm.

The textile can include up to 20% by weight of fibers different in chemical nature from that of the glass fibers, preferably at most 10%.

Mention may be made, as examples of such fibers, of natural organic fibers, such as silk, wool, cotton and cellulose or wood fibers; synthetic fibers, such as viscose or rayon; polymer fibers, in particular made of polyethylene, polypropylene, polystyrene, poly(meth)acrylate, polyimide, polyvinyl chloride, polyacrylonitrile, poly(vinyl acetate), poly(vinyl alcohol), polyester, such as polyethylene terephthalate, polytetrafluoroethylene and aramid; mineral fibers, such as silica, alumina, basalt or ceramic fibers; carbon fibers; and metal fibers, such as silver, copper or steel fibers.

The textile comprising the glass fibers and optionally the other fibers also comprises an organic binder, the role of which is to bond the fibers together and to "consolidate" them, which confers better mechanical properties on the textile, in particular a stiffness sufficient to be able to be easily handled without the risk that it may be torn.

The organic binder in accordance with the invention contains one or more organic polymers having a glass transition temperature (Tg) which varies from −10 to +25° C., measured by differential scanning calorimetry according to the standard ISO 11357-1:2009. Preferably, the glass transition temperature varies from 0 to +10° C.

Advantageously, all the organic polymers present in the organic binder have a glass transition temperature within the limits indicated above.

Generally, the organic polymer is chosen from copolymers of an olefin, such as ethylene, propylene, butylene or isobutylene, and of vinyl acetate, copolymers of vinyl acetate and of (meth)acrylic acid or of (meth)acrylate, copolymers of (meth)acrylate and of a monomer other than vinyl acetate, in particular styrene, homopolymers of (meth) acrylic acid or of acrylate, terpolymers of vinyl acetate, of an olefin and of a vinyl ester monomer, and acrylonitrile polymers, in particular copolymers of acrylonitrile and of (meth)acrylate, especially of acrylonitrile and of methyl methacrylate, and terpolymers of acrylonitrile, of butadiene and of styrene. Copolymers of (meth)acrylate and of styrene are preferred, in particular copolymers of butyl acrylate and of styrene.

The glass textile in the nonwoven form in accordance with the invention is obtained by applying an aqueous organic binder composition to the glass textile formed by the dry route or the wet route and by then subjecting the textile to a heat treatment in order to remove the water.

In the dry-route process, molten glass present in a furnace is conveyed toward a group of bushings from which filaments flow out by gravity and are drawn by a gaseous fluid. The mineral filaments are collected on a conveyor, where they become entangled, forming a mat.

The aqueous organic binder is applied to the upper face of the mat thus formed using an appropriate device, generally operating by curtain coating, and the excess organic binder is removed by suction on the opposite face. The mat subsequently enters a device containing hot air, the temperature of which, of the order of 200 to 250° C., is adjusted in order to remove the water and to crosslink the organic binder in a very short time, of the order of approximately ten seconds to 1 minute, and then the mat (nonwoven) is collected in the form of a roll.

In the wet-route process, the mat is obtained from an aqueous dispersion of cut glass fibers which is deposited, by means of a forming head, on a conveyor provided with perforations and the water is extracted through the conveyor by virtue of a suction box. The cut glass fibers remaining on the conveyor form a mat which is treated under the same conditions as those described for the dry-route process, in order to form a nonwoven.

The organic binder composition generally contains from 10 to 70% by weight of water, preferably from 30 to 60%.

The textile generally contains from 10 to 50% by weight of organic binder, calculated on the basis of the solid matter, preferably from 15 to 25%.

The textile can be formed of several identical or different textiles bonded together by a mechanical treatment, for example by needling or air jet, and the assemblage of these textiles is consolidated by the application of the abovementioned organic binder.

The textile generally exhibits a weight per unit area which varies from 10 to 800 g/m², preferably from 20 to 600 g/m², advantageously from 30 to 500 g/m² and better still from 35 to 120 g/m².

The core of the board is obtained from a plaster-based composition which comprises calcined gypsum and optional additives making it possible to improve the physicochemical properties of the final product and to obtain good application conditions.

The core can thus comprise the following additives in the following proportions by weight, expressed as parts per 100 parts by weight of plaster:
- from 0.1 to 25 parts of an adhesion agent, the role of which is to increase the adhesion with the plaster of the coating when the latter is made of paper or of cardboard, preferably at most 15 parts,
- from 0.001 to 10 parts of a setting accelerator, for example calcium sulfate hydrate or potassium sulfate,
- from 0.001 to 10 parts of a setting retarder,
- from 0 to 10 parts of a biocide, for example sodium omadine,
- from 0.0001 to 1 part of a foaming agent, the role of which is to create pores in order to reduce the density of the final product. Mention may be made, by way of example, of sodium alkyl ether sulfates and sodium lauryl sulfate,
- from 0 to 10 parts of at least one water repellent, for example a siloxane or a polysiloxane,
- from 0 to 20 parts of at least one flame retardant, for example vermiculite, silica, in particular of micrometric size, a clay or metal fibers,
- from 0 to 20 parts of at least one reinforcing agent, for example polymer fibers, mineral fibers, in particular glass fibers, and animal or plant fibers.

Preferably, the adhesion agent is a starch, in particular pretreated with an acid, a dextrin, a vegetable flour, in particular a wheat or corn flour, a cellulose derivative, for example a methylcellulose or a hydroxymethylcellulose, a vinyl polymer, for example a polyvinyl alcohol, a polyvinyl acetate or an ethylene/vinyl acetate copolymer, a (meth) acrylic acid or alkyl (meth)acrylate polymer, for example a polymethyl methacrylate, a polyvinylpyrrolidone, in particular crosslinked by a polystyrenesulfonate, a styrene/butadiene latex, a polyester resin or an epoxy resin.

Preferably again, the reinforcing agent consists of at most 5 parts of glass fibers having a length varying from 3 to 12.5 mm and a diameter varying from 5 to 50 µm, preferably at most 3 parts.

The plaster-based board is formed according to a process known per se which consists in mixing powdered calcined gypsum (calcium sulfate hemihydrate) with water in order to form a paste, which is continuously deposited between two sheets of paper or cardboard.

The product formed is compressed, in order to obtain the desired thickness, and then it is continuously transported on a conveyor over a distance which allows the paste to achieve a level of hardening sufficient to be able to be cut into boards of predetermined length. The boards are subsequently dried in a drying oven in order to remove the excess water.

The thickness of the board thus obtained can vary from 6 to 25 millimeters and is preferably of the order of 12.5 millimeters.

Conventionally, calcium sulfate hemihydrate ($CaSO_4.0.5H_2O$; calcined gypsum), whether natural or synthetic, that is to say resulting in particular from the desulfurization of power plant gases, undergoes a hydration reaction in the presence of water and is converted into calcium sulfate dihydrate ($CaSO_4.2H_2O$: gypsum).

The amount of calcined gypsum employed to form the paste generally varies from 50 to 150 parts by weight per 100 parts by weight of water and preferably from 60 to 120 parts.

As indicated above, the textile in accordance with the invention replaces at least one of the coating layers made of paper or of cardboard coating the main faces of the plaster-based board, and/or said textile is incorporated in the core made of plaster.

According to a first alternative form, the plaster-based board comprises a textile which is positioned on one of the main faces of the core made of plaster or is embedded in the plaster.

According to a second alternative form, the plaster-based board comprises two textiles positioned on the two main faces of the core made of plaster, or one textile on one of these faces and the other embedded in the plaster.

According to a third alternative form, the plaster-based board comprises two textiles positioned on the two main faces of the core made of plaster and a third textile embedded in the plaster.

In all the abovementioned alternative forms, the textile incorporated in the core of the board is positioned parallel to the layers of paper, of cardboard or of textile which coat the main faces of the core, and preferably the textile is located at an equal distance from the two coating layers.

However, the incorporation of several identical or different textiles in the plaster core should not be excluded, it being possible for these textiles to be distributed in the thickness of the plaster in a uniform or nonuniform way, and in particular it being possible for these textiles to be juxtaposed.

Another subject matter of the present invention relates to the use of a textile as described above, including glass fibers and an organic binder comprising at least one organic polymer exhibiting a glass transition temperature which varies from −10 to +25° C., for improving the acoustic properties, in particular the acoustic insulation properties, of a plaster-based board comprising a core made of plaster positioned between two coating layers, in which said textile constitutes the coating layer or layers and/or is embedded in the core made of plaster. The present invention also relates to a process for improving the acoustic properties of a plaster-based board comprising the provision of a textile as described above, including glass fibers and an organic binder comprising at least one organic polymer exhibiting a glass transition temperature which varies from −10 to +25° C., and the incorporation of said textile in the plaster-based board, the textile constituting a coating layer and/or being embedded in the core made of plaster.

Another subject matter of the present invention relates to the use of a plaster-based board in accordance with the invention for improving the acoustic insulation in a building. The present invention also relates to a process for improving the acoustic insulation in a building, comprising the installation of a plaster-based board according to the invention in order to form wall surfaces, false ceilings, floors and/or partition walls.

The plaster-based board in accordance with the invention can be used as is or in combination with another material, for example a mineral or wood wool, or a polymer, in order to form an acoustic and/or thermal panel, or else an interlayer polymer film providing the bonding between two plaster-based boards, in order to form a composite panel.

This board can be used to form wall surfaces, false ceilings, floors and partition walls.

The examples which follow make it possible to illustrate the invention without, however, limiting it.

EXAMPLES 1 TO 10

Plaster-based boards comprising one or two textiles in accordance with the invention are manufactured under the following conditions:

a) a plaster composition is prepared by introducing 1000 g of calcium sulfate hemihydrate, 5 g of starch, 0.1 g of a setting accelerator (fine gypsum treated with sucrose), 0.05 g of a setting retarder (Plast Retard L, sold by Sicit 2000) and 750 g of water into a mixer provided with a three-bladed stirrer at the speed of 650 rpm for 15 seconds and then 1850 rpm for 45 seconds.

b) a foam is prepared by introducing 138.5 g of water and 1.4 g of foaming agent (Milifoam®, sold by Huntsman) into a mixer provided with a three-bladed stirrer at the speed of 3300 rpm for 1 minute.

c) the plaster composition obtained in stage a) and 30 g of foam obtained in stage b) are introduced into a mixer provided with a planetary paddle operating at the speed of 250 rpm for 50 seconds, in order to obtain a paste.

d) the paste is poured into a brass mold comprising 4 parallelepipedal cavities (length: 300 mm; width: 30 mm; depth: 13 mm), the internal walls of which are coated with a layer of oil and the bottom of which is coated with a sheet of cardboard or of the textile according to the invention.

When a textile in accordance with the invention is incorporated in the paste, the paste is first poured into the mold over a thickness of 6 mm, then the textile, cut to the size of the mold, is deposited and the mold is filled with the paste.

A sheet of cardboard or a textile, having the size of the mold, is deposited over the paste and the mold is closed with a board on which two weights each of 5 kg are placed.

The boards are removed from the mold after 20 minutes, left in the open air for 10 minutes, then placed in a first drying oven at 180° C. for 35 minutes and in a second drying oven at 100° C. for 25 minutes. The boards are stored in a dry chamber at 40° C.

In the examples, use is made of:
- a nonwoven (1) consisting of filaments of E glass (diameter: 10 µm; length: 10 mm) obtained by the wet route and bonded by an aqueous binder containing 50% by weight of a copolymer of butyl acrylate and of styrene (sold under the reference Acronal S 537 S by BASF; Tg=−5° C.). The nonwoven contains 15% by weight of binder, calculated on the basis of the solid matter, and exhibits a weight per unit area equal to 50 g/m²,
- a nonwoven (2) consisting of continuous filaments of C glass (diameter 5-13 µm) obtained by the dry route and bonded by an aqueous binder containing 50% by weight of a copolymer of butyl acrylate and of styrene (sold under the reference Acronal S 537 S by BASF; Tg=−5° C.). The nonwoven contains 20% by weight of binder, calculated on the basis of the solid matter, and exhibits a weight per unit area equal to 80 g/m²,
- a nonwoven (3) consisting of filaments of E glass (diameter: 10 µm; length: 10 mm) obtained by the wet route and bonded by an aqueous binder containing 47% by weight of a copolymer of butadiene and of styrene (sold under the reference Litex S 9076 by Synthomer; Tg=−44° C.). The nonwoven contains 15% by weight of binder, calculated on the basis of the solid matter, and exhibits a weight per unit area equal to 50 g/m²,
- a nonwoven (4) consisting of filaments of E glass (diameter: 10 µm; length: 10 mm) obtained by the wet route and bonded by an aqueous binder containing 50% by weight of a copolymer of butadiene and of styrene (sold under the reference Lipaton SB 5841 by Synthomer; Tg=−5° C.). The nonwoven contains 15% by weight of binder, calculated on the basis of the solid matter, and exhibits a weight per unit area equal to 50 g/m²,
- a nonwoven (5) consisting of filaments of E glass (diameter: 10 µm; length: 10 mm) obtained by the wet route and bonded by an aqueous binder containing 50% by weight of a copolymer of butadiene and of styrene (sold under the reference Synthomer VL10946 by Synthomer; Tg=−50° C.). The nonwoven contains 15% by weight of binder, calculated on the basis of the solid matter, and exhibits a weight per unit area equal to 50 g/m²,
- a nonwoven (6) consisting of filaments of E glass (diameter: 10 µm; length: 10 mm) obtained by the wet route and bonded by an aqueous binder containing 25% by weight of a copolymer of methacrylic acid and of acrylic ester (sold under the reference Rohagit sd 40 by Synthomer; Tg=100° C.). The nonwoven contains 15% by weight of binder, calculated on the basis of the solid matter, and exhibits a weight per unit area equal to 50 g/m², and
- a sheet of cardboard (V5 sold by Saint-Regis).

Example 1 comprises a nonwoven (1) on one face of the board and a sheet of cardboard on the other face.

Example 2 comprises a nonwoven (1) on each face of the board.

Example 3 comprises a nonwoven (2) on one face of the board and a sheet of cardboard on the other face.

Example 4 comprises a nonwoven (2) on each face of the board.

Example 5 comprises a nonwoven in the core made of plaster, at midheight of the thickness, and a cardboard on each face of the board.

Example 6 comprises a nonwoven (4) on each face of the board.

Example 7 comprises a nonwoven (5) on each face of the board.

Comparative example 8 comprises a nonwoven (6) on each face of the board.

Comparative example 9 comprises a nonwoven (7) on each face of the board.

By way of reference, a board comprising two sheets of cardboard and not including any textile in accordance with the invention in the core made of plaster was prepared under the same conditions (reference example 10).

The acoustic performance levels of the boards are evaluated by measuring their mechanical impedance MIM (Measurement of Mechanical Impedance) under the conditions of the standard ISO 16940:2008(E). The dynamic Young's modulus (in $GN/m^2$) and the loss factor $\eta$ (in %) are calculated from the curve of the acceleration frequency (dB) as a function of the frequency (Hz). The acoustic gain with respect to the board of (comparative) example 6 is also calculated.

The results are given in the following table.

|  | Weight per unit area ($kg/m^2$) | Dynamic Young's modulus ($GN/m^2$) | Loss factor (%) | Acoustic gain (%) |
|---|---|---|---|---|
| Ex. 1 | 8.7 | 2.33 | 1.78 | 24 |
| Ex. 2 | 8.4 | 1.79 | 1.10 | 41 |
| Ex. 3 | 8.9 | 2.73 | 0.48 | 10 |
| Ex. 4 | 9.0 | 2.64 | 0.69 | 13 |
| Ex. 5 | 9.3 | 1.62 | 9.95 | 47 |
| Ex. 6 | 9.1 | 1.75 | 3.24 | 28 |
| Ex. 7 | 9.1 | 1.52 | 4.52 | 38 |
| Ex. 8 (Comp) | 8.9 | 2.36 | 0.46 | 3.3 |
| Ex. 9 (Comp) | 9.0 | 2.89 | 0.38 | −18 |
| Ex. 10 (Ref) | 9.30 | 3.05 | 0.15 | — |

The invention claimed is:

1. A plaster-based board comprising a core made of plaster positioned between two coating layers, and a textile including glass fibers and an organic binder comprising at least one organic polymer exhibiting a glass transition temperature which varies from −10 to +25° C., said textile constituting one of the coating layers or the two coating layers and/or being embedded in the core made of plaster, wherein the textile includes at least 80% by weight of glass fibers.

2. The board as claimed in claim 1, wherein the textile is a nonwoven or a fabric.

3. The board as claimed in claim 1, wherein the glass fibers are individual glass filaments having a diameter which varies from 5 to 30 μm, or strands comprising a plurality of the glass filaments or an assemblage of several base strands.

4. The board as claimed in claim 1, wherein the textile includes up to 20% by weight of fibers different in chemical nature from the glass fibers.

5. The board as claimed in claim 4, wherein the fibers different in chemical nature from the glass fibers are organic natural or synthetic fibers.

6. The board as claimed in claim 4, wherein the fibers different in chemical nature from the glass fibers are polymer fibers, mineral fibers, carbon fibers or metal fibers.

7. The board as claimed in claim 1, wherein the organic polymer is chosen from copolymers of an olefin and of vinyl acetate, copolymers of vinyl acetate and of (meth)acrylic acid or of (meth)acrylate, copolymers of (meth)acrylate and of a monomer other than vinyl acetate, homopolymers of (meth)acrylic acid or of acrylate, terpolymers of vinyl acetate, of an olefin and of a vinyl ester monomer, acrylonitrile polymers, and terpolymers of acrylonitrile, of butadiene and of styrene.

8. The board as claimed in claim 7, wherein the organic polymer is a copolymer of butyl acrylate and of styrene.

9. The board as claimed in claim 7, wherein the olefin is ethylene, propylene, butylene or isobutylene, wherein the monomer other than vinyl acetate is styrene, and wherein the acrylonitrile polymers are copolymers of acrylonitrile and of (meth)acrylate.

10. The board as claimed in claim 1, wherein the organic polymer has a glass transition temperature (Tg) which varies from 0 to +10° C.

11. The board as claimed in claim 1, wherein the textile contains from 10 to 50% by weight of organic binder, calculated on the basis of solid matter.

12. The board as claimed in claim 11, wherein the textile contains from 15 to 25% by weight of organic binder, calculated on the basis of the solid matter.

13. The board as claimed in claim 1, wherein the textile exhibits a weight per unit area which varies from 10 to 800 $g/m^2$.

14. The board as claimed in claim 13, wherein the textile exhibits a weight per unit area which varies from 30 to 500 $g/m^2$.

15. The board as claimed in claim 14, wherein the textile exhibits a weight per unit area which varies from 35 to 120 $g/m^2$.

16. The board as claimed in claim 1, wherein the board has a thickness which varies from 6 to 25 millimeters.

17. The board as claimed in claim 16, wherein the board has a thickness of the order of 12.5 millimeters.

18. The board as claimed in claim 1, wherein the textile includes at least 90% by weight of glass fibers.

19. The board as claimed in claim 1, wherein said textile is made of a mat including said glass fibers and said organic binder, said organic binder penetrating through a thickness of said mat to form said textile.

20. The board as claimed in claim 19, wherein said textile consists of said mat of said glass fibers and said organic binder.

21. The board as claimed in claim 1, wherein said organic binder is the only binder that is used to form said textile.

22. A method comprising improving the acoustic insulation in a building with a plaster-based board as claimed in claim 1.

23. A plaster-based board comprising a core made of plaster positioned between two coating layers, and a textile including glass fibers and an organic binder comprising at least one organic polymer exhibiting a glass transition temperature which varies from −10 to +25° C., said textile constituting one of the coating layers or the two coating layers and/or being embedded in the core made of plaster, wherein the organic polymer is an acrylonitrile polymer that is a copolymer of acrylonitrile and of methyl methacrylate.

24. A method comprising improving the acoustic properties of a plaster-based board comprising a core made of plaster positioned between two coating layers with a textile, including glass fibers and an organic binder comprising at least one organic polymer exhibiting a glass transition temperature which varies from −10 to +25° C., in which said textile constitutes one of the coating layers or the two coating layers and/or is embedded in the core made of plaster, wherein the textile includes at least 80% by weight of glass fibers.

* * * * *